United States Patent
Rafique

(10) Patent No.: US 12,444,851 B2
(45) Date of Patent: Oct. 14, 2025

(54) MECHANISMS FOR ADJUSTING ATOMS OF AN INTELLIGENT REFLECTIVE SURFACE

(71) Applicant: Telefonaktiebolaget LM Ericsson (publ), Stockholm (SE)

(72) Inventor: Raihan Rafique, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 327 days.

(21) Appl. No.: 18/275,265

(22) PCT Filed: Feb. 2, 2021

(86) PCT No.: PCT/EP2021/052416
§ 371 (c)(1),
(2) Date: Aug. 1, 2023

(87) PCT Pub. No.: WO2022/167056
PCT Pub. Date: Aug. 11, 2022

(65) Prior Publication Data
US 2024/0106131 A1 Mar. 28, 2024

(51) Int. Cl.
*H01Q 15/14* (2006.01)
*H01Q 15/00* (2006.01)
(Continued)

(52) U.S. Cl.
CPC ......... *H01Q 15/148* (2013.01); *H01Q 15/002* (2013.01); *H04B 7/04013* (2023.05); *H04B 17/328* (2023.05)

(58) Field of Classification Search
None
See application file for complete search history.

(56) References Cited

U.S. PATENT DOCUMENTS

| 2021/0013619 A1 | 1/2021 | Alkhateeb et al. |
| 2023/0047993 A1* | 2/2023 | Jian ............... H04W 72/121 |

OTHER PUBLICATIONS

Abeywickrama, et al., "Intelligent Reflecting Surface: Practical Phase Shift Model and Beamforming Optimization," IEEE Transactions on Communications, vol. 68, Issue 9, Sep. 2020, pp. 5849-5863.
(Continued)

*Primary Examiner* — Hong S Cho
(74) *Attorney, Agent, or Firm* — Withrow & Terranova, PLLC

(57) ABSTRACT

Mechanisms for adjusting atoms of an Intelligent Reflective Surface (IRS) are provided. A method is performed by a controller configured to control an IRS comprising an array of atoms, each having an individually adjustable phase shift and gain. At least some of the atoms are provided with a measurement sensor. The method comprises obtaining, from the measurement sensors, measurements of received power of a signal transmitted from a user equipment and received by the atoms and determining, by a gradient in received power between two of the measurement sensors is larger than a threshold value, that the user equipment is in near-field of the IRS. The method comprises, as a result thereof, adjusting the phase shift of a first subset of the atoms for reflection at the IRS of subsequent communication between a network node and the user equipment when the user equipment is in the near-field of the IRS.

17 Claims, 8 Drawing Sheets

(51) Int. Cl.
*H04B 7/04* (2017.01)
*H04B 17/318* (2015.01)

(56) References Cited

OTHER PUBLICATIONS

Bjornson, et al., "Demystifying the Power Scaling Law of Intelligent Reflecting Surfaces and Metasurfaces," 8th International Workshop on Computational Advances in Multi-Sensor Adaptive Processing, Dec. 15-18, 2019, Le Gosier, Guadeloupe, IEEE, 5 pages.
Dajer, et al., "Reconfigurable Intelligent Surface: Design the Channel—a New Opportunity for Future Wireless Networks," arxiv.org/pdf/2010.07408.pdf, Cornell University, Oct. 14, 2020, 22 pages.
Di Renzo, et al., "Smart radio environments empowered by reconfigurable AI meta-surfaces: an idea whose time has come," EURASIP Journal on Wireless Communications and Networking, vol. 129, 2019, 20 pages.
Ernfors, Erika, "Radio Stripes: re-thinking mobile networks," Ericsson Blog, ericsson.com/en/blog/2019/2/radio-stripes, Feb. 25, 2019, 7 pages.
Tang, et al., "Wireless Communications With Reconfigurable Intelligent Surface: Path Loss Modeling and Experimental Measurement," IEEE Transactions on Wireless Communications, vol. 20, Issue 1, Sep. 2020, pp. 421-439.
Wu, et al., "Intelligent Reflecting Surface-Aided Wireless Communications: A Tutorial," IEEE Transactions on Communications, vol. 69, Issue 5, May 2021, pp. 3313-3351.
Wu, et al., "Intelligent Reflecting Surface Enhanced Wireless Network via Joint Active and Passive Beamforming," IEEE Transactions on Wireless Communications, vol. 18, Issue 11, Nov. 2019, 35 pages.
Yuan, et al., "Reconfigurable-Intelligent-Surface Empowered Wireless Communications: Challenges and Opportunities," IEEE Wireless Communications, vol. 28, Issue Aug. 2, 2020, 7 pages.
International Search Report and Written Opinion for International Patent Application No. PCT/EP2021/052416, mailed Nov. 22, 2021, 12 pages.

\* cited by examiner

MECHANISMS FOR ADJUSTING ATOMS OF AN INTELLIGENT REFLECTIVE SURFACE

This application is a 35 U.S.C. § 371 national phase filing of International Application No. PCT/EP2021/052416, filed Feb. 2, 2021, the disclosure of which is incorporated herein by reference in its entirety.

TECHNICAL FIELD

Embodiments presented herein relate to a method, a controller, a computer program, and a computer program product for adjusting atoms of an intelligent reflective surface.

BACKGROUND

Millimeter waves (mmWaves) corresponding to carrier frequencies above 10 GHz have been introduced for the new radio (NW) air interface as used in fifth generation (5G) telecommunication systems. However, communication over mmWaves are sensible to blocking, i.e. physical objects blocking the radio waves. Although the blocking itself might be unavoidable, there are means that can be introduced that reduce the effects of the blocking. One such means is the use of smart radio environments. One technique enabling the creation of such smart radio environments involves the use of surfaces that can interact with the radio environment. This is illustrated in FIG. 1. FIG. 1 shows a communications network 100 where a network node 110 is configured to communicate with a user equipment 130. The network node 110 might be a radio access network node, radio base station, base transceiver station, node B (NB), evolved node B (eNB), gNB, access point (AP), access node, or integrated access and backhaul (IAB) node. The user equipment 130 might be a portable wireless device, mobile station, mobile phone, handset, wireless local loop phone, smartphone, laptop computer, tablet computer, wearable electronic device, Internet-of-Things (IoT) device, network equipped sensor, or network equipped vehicle.

In the illustrative example of FIG. 1, the line of sight signal path corresponding to communication channel 140a is blocked by a physical object 150a. An intelligent reconfigurable surface 120 is provided at physical object 150b such that the signal from network node 110 reaches user equipment 130 via the non-line of sight signal path corresponding to communication channel 140b.

As disclosed in, for example, "*Smart Radio Environments Empowered by AI Reconfigurable Meta-Surfaces: An Idea Whose Time Has Come*" by Marco Di Renzo et al., as accessible on https://arxiv.org/abs/1903.08925 (latest accessed 20 Sep. 2020), "*Reconfigurable-Intelligent-Surface Empowered Wireless Communications: Challenges and Opportunities*" by Xiaojun Yuan et al., as accessible on https://arxiv.org/abs/2001.00364 (latest accessed 20 Sep. 2020), and "*Intelligent Reflecting Surface Enhanced Wireless Network via Joint Active and Passive Beamforming*" by Q. Wu and R. Zhang, in IEEE Transactions on Wireless Communications, vol. 18, no. 11, pp. 5394-5409, November 2019, doi: 10.1109/TWC.2019.2936025 such surfaces are commonly called intelligent reconfigurable surfaces (IRS), meta-surfaces, reconfigurable intelligent surfaces, large intelligent surfaces. Without loss of generality or discrimination between these terms, the term IRS will be used throughout this disclosure.

For communication in the far-field of the electromagnetic field (EM) around the IRS, the directions of expected wave propagation for each of the element of the IRS are parallel with almost equal distance. Equal distance implies that the path losses and the phase of the EM at all the elements are same and thus added constructively. Generally, the IRS has a comparatively large surface, compared to the surface of an antenna array of a traditional network node. Therefore, the far-field will be located further away from the IRS compared to a traditional network node. This will imply that the user equipment in some operational conditions will be in the near-field of the IRS. When the user equipment is in the near-field, the directions of expected wave propagation at the elements of the IRS will no longer be parallel. Additionally, the distance between each element of the IRS and the user equipment will be different. This negatively affects the communication channel between the network node and the user equipment. As a result, the collective signal at the user equipment will be uncontrolled and the received power at the user equipment will be sensitive to a slight change in position of the user equipment. In the worst case, the communication via the IRS between the network node and the user equipment is interrupted when the user equipment is located in the near-field of the IRS.

Hence, there is a need for enabling the communication between the network node and the user equipment to be maintained when the user equipment is located in the near-field of the IRS.

SUMMARY

An object of embodiments herein is to provide a method, a controller, a computer program, and a computer program product that address the above issues.

According to a first aspect there is presented a method for adjusting atoms of an IRS. The method is performed by a controller. The controller is configured to control the IRS. The IRS comprises an array of the atoms. Each of the atoms has an individually adjustable phase shift and gain. At least some of the atoms are provided with a measurement sensor. The method comprises obtaining, from the measurement sensors, measurements of received power of a signal transmitted from a user equipment and received by the atoms. The method comprises determining, by a gradient in received power between two of the measurement sensors is larger than a threshold value, that the user equipment is in near-field of the IRS. The method comprises, as a result thereof, adjusting the phase shift of a first subset of the atoms for reflection at the IRS of subsequent communication between a network node and the user equipment when the user equipment is in the near-field of the IRS.

According to a second aspect there is presented a controller for adjusting atoms of an IRS. The controller is configured to control the IRS. The IRS comprises an array of the atoms. Each of the atoms has an individually adjustable phase shift and gain. At least some of the atoms are provided with a measurement sensor. The controller comprises processing circuitry. The processing circuitry is configured to cause the controller to obtain, from the measurement sensors, measurements of received power of a signal transmitted from a user equipment and received by the atoms. The processing circuitry is configured to cause the controller to determine, by a gradient in received power between two of the measurement sensors is larger than a threshold value, that the user equipment is in near-field of the IRS. The processing circuitry is configured to cause the controller to, as a result thereof, adjust the phase shift of a first subset of the atoms for reflection at the IRS of subsequent communication between a network node and the user equipment when the user equipment is in the near-field of the IRS.

According to a third aspect there is presented a controller for adjusting atoms of an IRS. The controller is configured to control the IRS. The IRS comprises an array of the atoms. Each of the atoms has an individually adjustable phase shift and gain. At least some of the atoms are provided with a measurement sensor. The controller comprises an obtain module configured to obtain, from the measurement sensors, measurements of received power of a signal transmitted from a user equipment and received by the atoms. The controller comprises a determine module configured to determine, by a gradient in received power between two of the measurement sensors is larger than a threshold value, that the user equipment is in near-field of the IRS. The controller comprises an adjust module configured to, as a result thereof, adjust the phase shift of a first subset of the atoms for reflection at the IRS of subsequent communication between a network node and the user equipment when the user equipment is in the near-field of the IRS.

According to a fourth aspect there is presented a computer program for adjusting atoms of an IRS, the computer program comprising computer program code which, when run on a controller, causes the controller to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously these aspects resolve the above issues.

Advantageously these aspects enable the communication between the network node and the user equipment to be maintained when the user equipment is located in the near-field of the IRS.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above there is a need for enabling the communication between the network node and the user equipment to be maintained when the user equipment is located in the near-field of the IRS.

In one example the IRS consists of arrays of passive patch antennas also denoted passive elements, where each patch antenna/element comprises an atom. The embodiments disclosed herein relate to mechanisms for adjusting atoms of an IRS. In order to obtain such mechanisms there is provided a controller, a method performed by the controller, a computer program product comprising code, for example in the form of a computer program, that when run on the controller, causes the controller to perform the method.

The IRS 120 comprises an array of elements, each comprising an atom, extending in the azimuth and the elevation directions. The locations of each element (or relative distance between the elements) are known. In some examples, the elements are equally spaced in azimuth and the elevation directions. Each element may have a setup to adjust the phase and gain of the reflected signal to create desire beam at the IRS 120. Additionally, each element is having termination so the amplitude of the reflected signal to be controlled.

Figure 1:
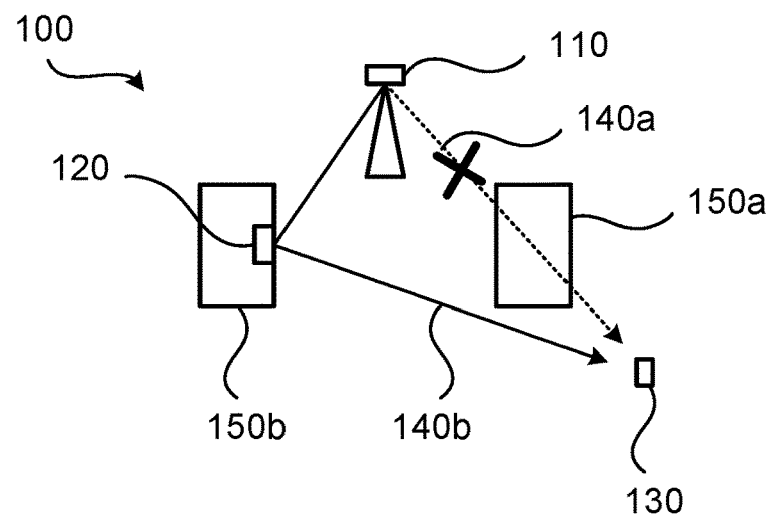
FIG. 1 is a schematic diagram illustrating a communications network according to embodiments.
Figure 2:
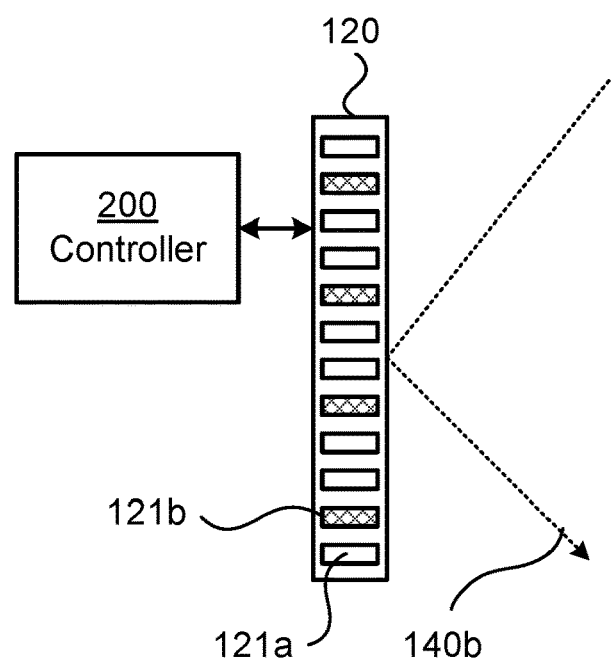
FIG. 2 schematically illustrates an IRS and a controller according to an embodiment.

FIG. 2 schematically illustrates an IRS 120 comprising two types of elements 121a, 121b, where each element 121a, 121b comprises an atom. An IRS 120 comprising an array of elements 121a, 121b thus comprises an array of atoms (see FIGS. 3 and 4). A controller 200 is configured to, by means of adapting the individual phase shift and/or gain of each atom, control the reflection angle of the IRS 120, and thus how the signal path corresponding to communication channel 140b is reflected at the IRS 120. In this respect, the atoms are not connected to active radio transceivers (i.e., devices capable to modulate data streams up to radio frequency and demodulate radio frequencies to data streams). Instead, the atoms in the array are connected to resistors, inductors, and/or capacitors of which the electrical impedance is controllable, and where the atoms are connected to the resistors, inductors, and/or capacitors towards a ground plane such that the reflection phase of respective atoms can be adapted based on electrical impedance setting. Thus, by controlling the electrical impedances of the respective atoms, the reflection angle of an incoming electromagnetic wave can be adapted according to the generalized Snell's law. The IRS 120 might be part of, or operatively connected to, a network node.

Each of the elements 121a, 121b comprises an atom. In short, each of the second type of elements 121b comprises a measurement sensor whereas the first type of elements 121a do not comprise any measurement sensor. There could be different ways in which the first type of elements 121a and the second type of elements 121b are distributed in the array. According to a first example, the atoms provided with the measurement sensors are evenly distributed throughout the IRS 120. According to a second example, the atoms provided with the measurement sensors are coarsely or randomly distributed throughout the IRS 120 (but still with known positions). Also further examples of how the first type of elements 121a and the second type of elements 121b could be distributed in the array are envisioned.

Figure 3:
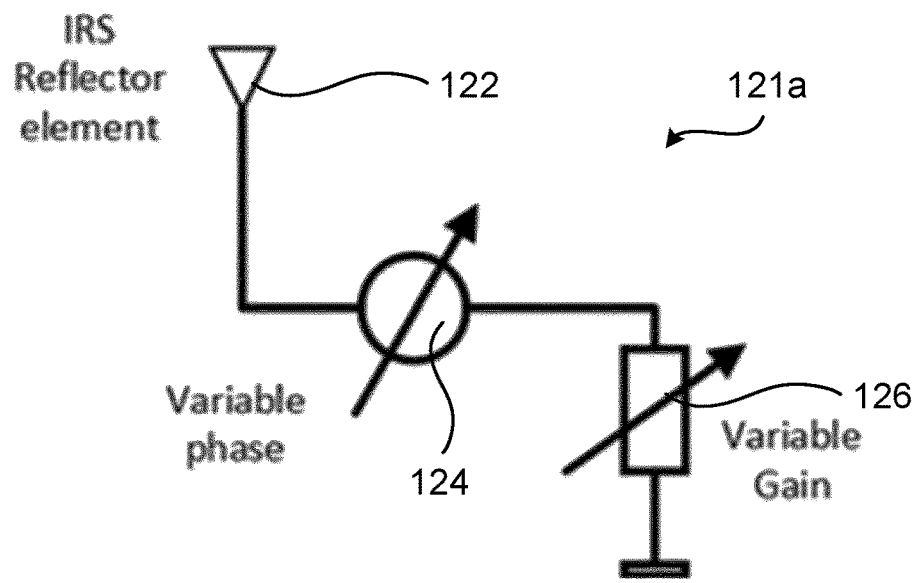
FIG. 3 schematically illustrates a first type of element of the IRS according to an embodiment.
Figure 4:
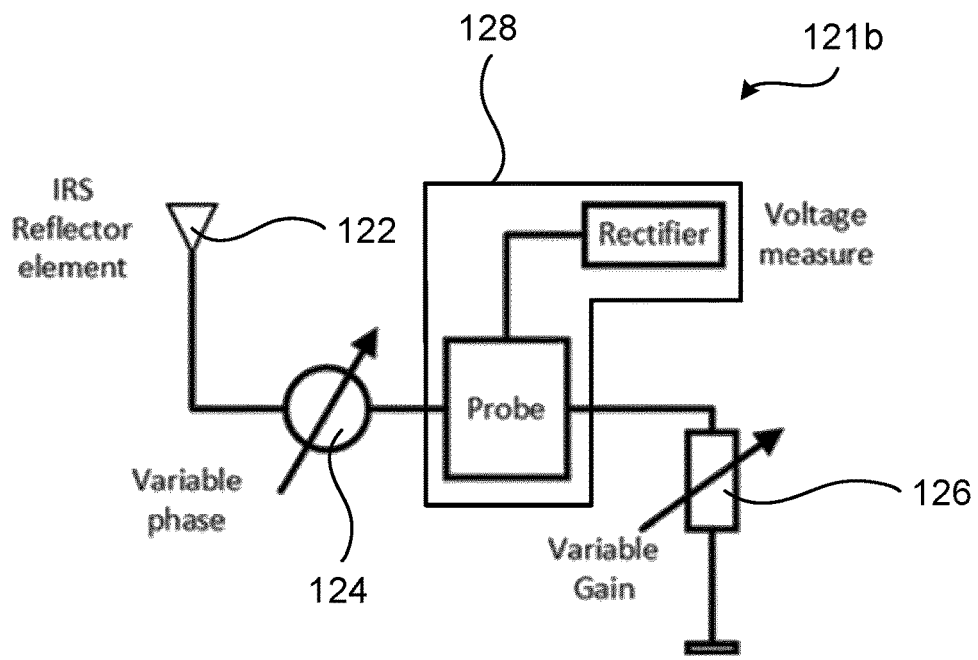
FIG. 4 schematically illustrates a second type of element of the IRS according to an embodiment.

Particular details of the first type of element 121a will be disclosed next with reference to FIG. 3 and particular details of the second type of element 121b will be disclosed next with reference to FIG. 4.

FIG. 3 schematically illustrates the first type of element 121a of the IRS 120 according to an embodiment. The first type of element 121a comprises an atom 122 that is connected to ground via a phase shifter 124 and an impedance adjuster 126. The phase shifter 124 is configured to introduce a delay between the incident signal and reflected signal out from the atom 122. The phase can thereby be controlled to create a beam for the reflected signal, thus determining the refection angle and creating a beam pattern for the reflected signal. The impedance adjuster 126 is configured to adjust the gain of the reflected signal. The gain can thereby be controlled by varying the load impedance to create a beam pattern or to mute the atom 122, by setting the matched load. The amount of phase shift to be applied by the phase shifter 124 and the amount of gain to be applied by the impedance adjuster 126 are controlled by the controller 200.

FIG. 4 schematically illustrates the second type of element 121b of the IRS 120 according to an embodiment. The second type of element 121b comprises an atom 122 that is connected to ground via a phase shifter 124, a measurement sensor 128, and an impedance adjuster 126. In turn, the measurement sensor 128 comprises a probe and a rectifier. The measurement sensor 128 is configured to measure the received signal at the atom 122 from the user equipment. The probe will act as a coupler to couple a small amplitude signal. The probe is connected to a rectifier and thus a direct current (DC) voltage can be measured, which will give information of received power of the received signal at that element. The probe could be placed at a known position, e.g. the reflecting load for variable gain adjustment. This might aid to minimize dependency to the different phase and gain setting of the element.

Figure 5:
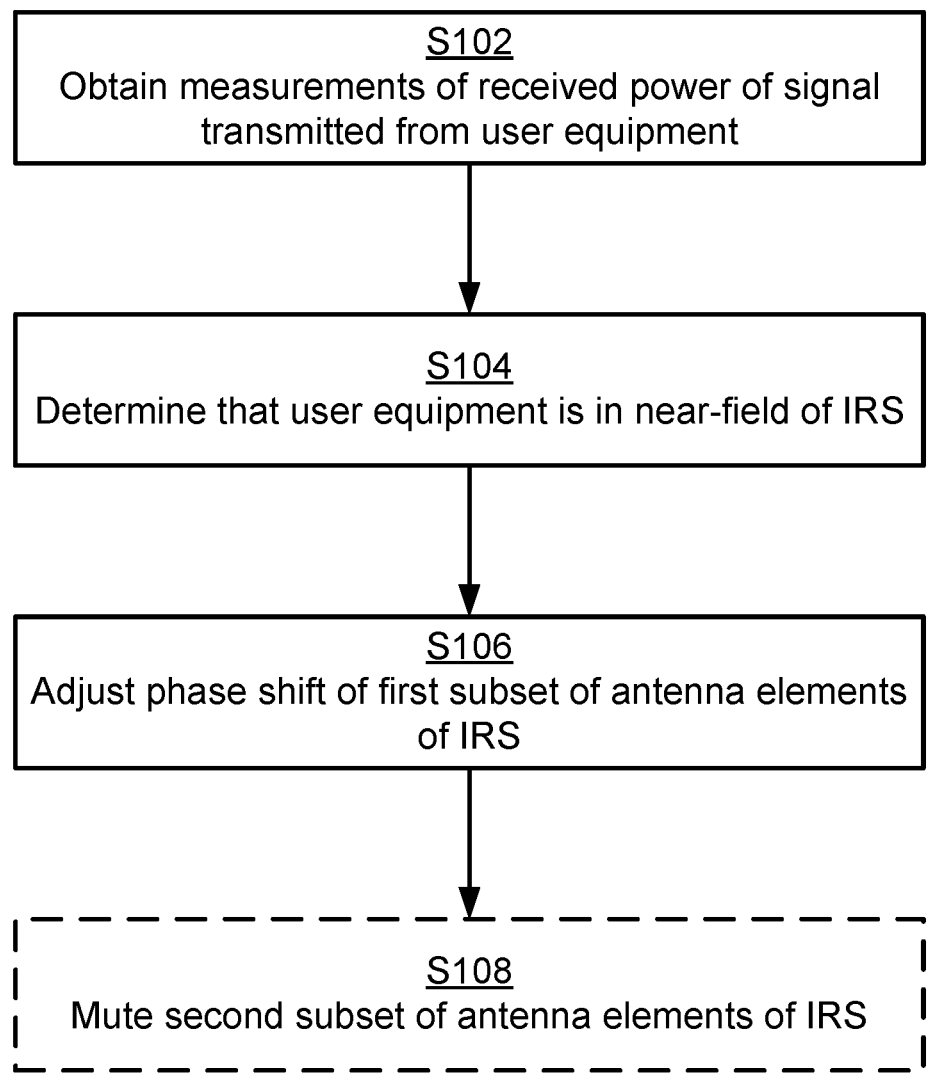
FIG. 5 is a flowchart of methods according to embodiments.

FIG. 5 is a flowchart illustrating embodiments of methods for adjusting atoms 122 of an IRS 120. The methods are performed by the controller 200. The methods are advantageously provided as computer programs 1520. The controller 200 is configured to control the IRS 120. The IRS 120 comprises an array of atoms 122. Each of the atoms 122 has an individually adjustable phase shift and gain. At least some of the atoms 122 are provided with a measurement sensor 128.

S102: The controller 200 obtains, from the measurement sensors 128, measurements of received power of a signal transmitted from a user equipment 130 and received by the atoms 122.

When the user equipment 130 is in the near-field of the IRS 120, the individual paths between the user equipment 130 and each of the atoms 122 of the IRS 120 will not be parallel and hence not be equally long (see FIG. 8 as referenced below for an illustration of this). Therefore, the distance between the user equipment 130 and the IRS 120 will vary considerably between different individual atoms 122 of the IRS 120 and thus the phase delay will vary considerably between different individual atoms 122 of the IRS 120.

S104: The controller 200 determines, by a gradient in received power between two of the measurement sensors 128 being larger than a threshold value, that the user equipment 130 is in the near-field of the IRS 120.

S106: The controller 200 as a result thereof (i.e., as a result of having determined that the user equipment 130 is in the near-field of the IRS 120) adjusts the phase shift of a first subset of the atoms 122 for reflection at the IRS 120 of subsequent communication between a network node 110 and the user equipment 130 when the user equipment 130 is in the near-field of the IRS 120.

Hence, there is provided a method where a user equipment 130 is identified to be in the near-field of the IRS 120 with or without assistance from the user equipment 130. If the controller 200 determines the user equipment 130 to be in the near-field the IRS 120, the atoms 122 of the IRS 120 are at least phase-wise adjusted so that the phase of signals received at the atoms 122 are within reasonable range, thereby enabling the user equipment 130 to communicate with the network node 110 via the IRS 120 even in the near-field of the IRS 120.

Embodiments relating to further details of adjusting atoms 122 of an IRS 120 as performed by the controller 200 will now be disclosed.

In some aspects, not only a phase shift is applied but also the gain of at least some of the atoms 122 is adjusted. In particular, in some embodiments, some atoms 122 are muted. Hence, according to an embodiment, the controller 200 is configured to perform (optional) step S108:

S108: The controller 200 mutes (as a result of having determined that the user equipment 130 is in the near-field of the IRS 120) a second subset of the atoms 122 for reflection at the IRS 120 of the subsequent communication between the network node 110 and the user equipment 130.

In general terms, the phase is adjusted for all atoms 122 whose gain is not adjusted, and vice versa. That is, in some embodiments, each of the atoms 122 is either a member of the first subset or the second subset but not both. Hence, once the members of one of the subsets have been identified, also the members of the other one of the subsets are automatically identified.

There could be different ways for the controller 200 to select which atoms 122 to have the phase shift adjusted, i.e. to determine which atoms 122 to be part of the first subset. In some aspects, the selection is made with respect to the variation of angle of arrival.

Figure 6:
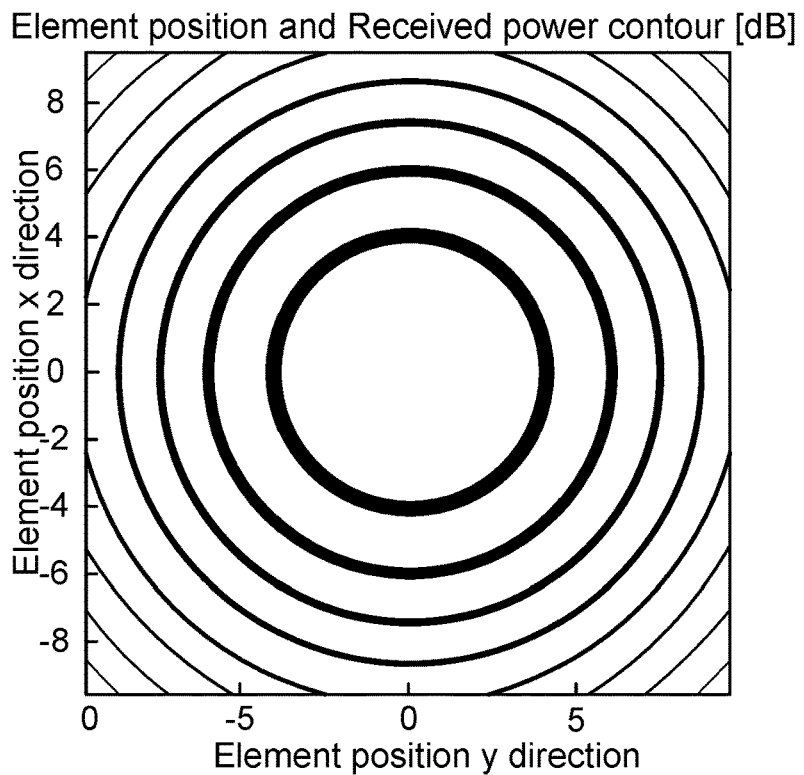
FIG. 6 schematically illustrates received power as a function of atom position of an IRS according to an embodiment.
Figure 7:
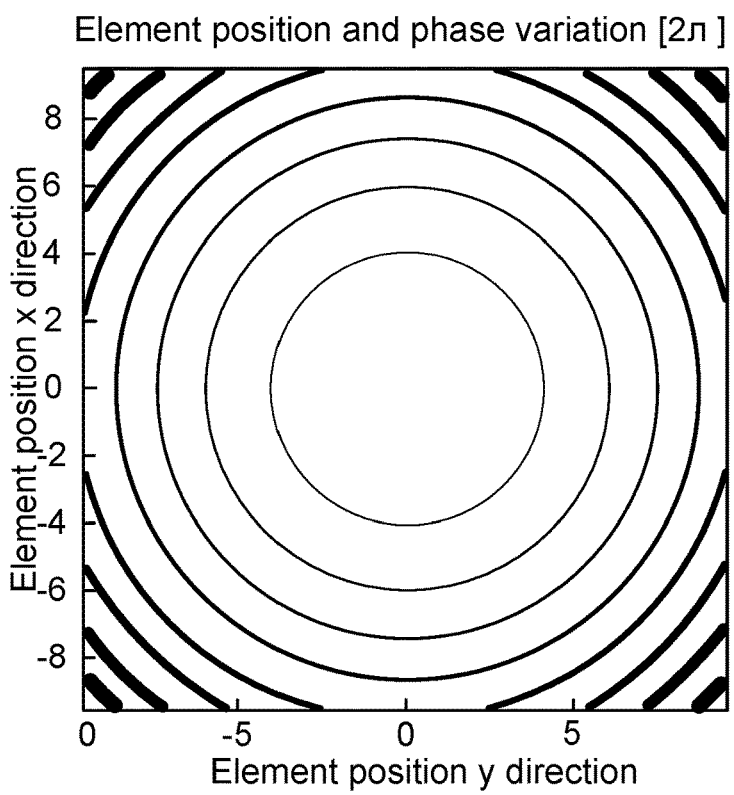
FIG. 7 schematically illustrates phase delay variation as a function of atom position of an IRS according to an embodiment.

FIG. 6 and FIG. 7 show examples in terms of received power and phase delay variation, respectively, as a function of atom position of an IRS where the user equipment is in the near-field of the IRS. The examples are the result of simulation of an IRS with 400 atoms where the atoms are arranged in a 20-by-20 array. In the array all atoms equally spaced apart such that their centers are separated by 3 mm. For the simulation the user equipment is located at the center position of the array and 0.10 m away from the array. In FIG. 6 the circles of lines with different thickness represent the relative power levels at each position of the atoms; the thicker the line, the higher the relative power levels. The thickest line represents a relative power level of about 19.8 dB whereas the thinnest line represents about 18.4 dB. From FIG. 6 thus follows that the difference between the received power among atoms at the center of the array and at edges of the array is more than 1 dB. In FIG. 7 the circles of lines with different thickness represent the relative phase delay at each position of the atoms; the thicker the line, the higher the relative phase delay. The thickest line represents a relative phase delay of about 11.2 times $2\pi$ whereas the thinnest line represents about 9.4 times $2\pi$. From FIG. 7 thus follows that the difference between the phase delay among atoms at the center of the array and at edges of the array is almost 2 times $2\pi$ (since the difference between 11.2 times $2\pi$ and 9.4 times $2\pi$ is 1.8 times $2\pi$).

In particular, in some embodiments, the atoms 122 in the first subset all yield an adjustment of the phase shift within a predefined interval and maximize number of members in the first subset subject to a power maximization criterion. The members of the first subset could thus be selected as those atoms 122 for which the variation of angle of arrival is within the predefined interval in combination with the condition to either maximize the number of members in the first subset or the atoms 122 that yield maximum total power, $P_{max}$. In this respect, the maximum total power can be expressed as:

$$P_{max} = \sum_{i}^{N} I_i A_i e^{j\theta_i},$$

where N are the total number of elements in the IRS, where j is the imaginary unit, i.e., $j^2 = -1$, where $A_i$ is the simulated or measured power of element i, where $\theta_i$ is the simulated phase component of element i, and where $I_i$={1,if element $i$ is selected 0,if element $i$ is not selected'

Similarly, the members of the second subset could be selected as those atoms 122 for which the variation of angle of arrival is not within the predefined interval. That is, in some embodiments, none of the atoms 122 in the second subset yield an adjustment of the phase shift within the predefined interval.

Figure 8:
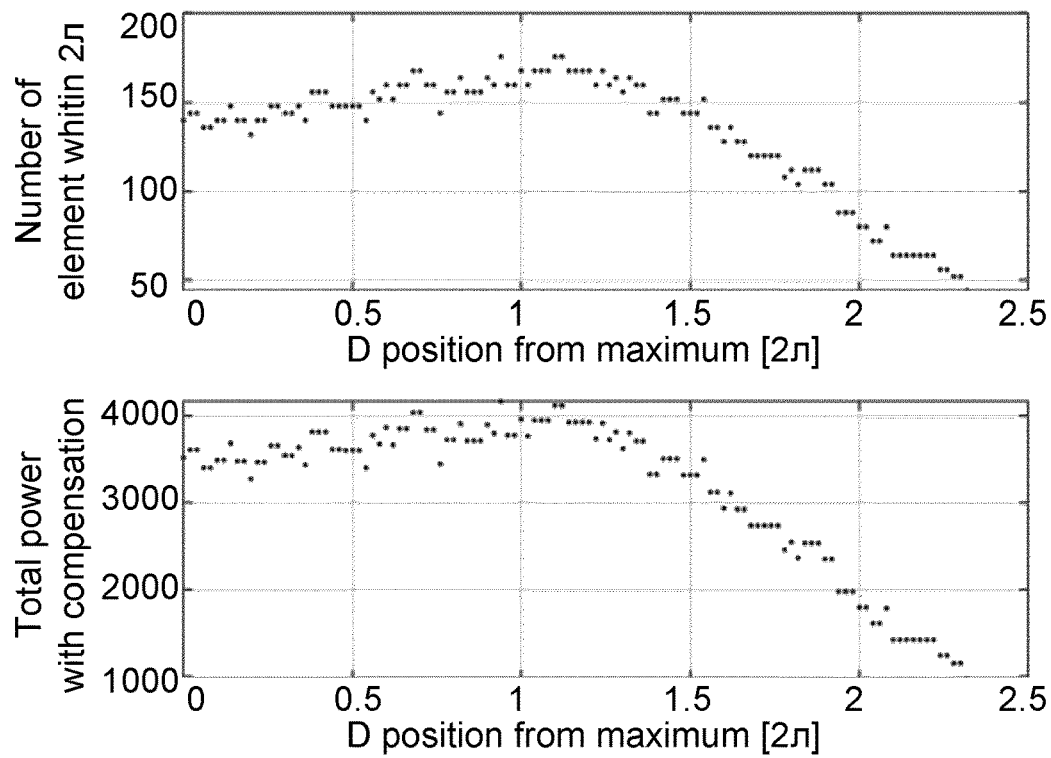
FIG. 8 schematically illustrates which number of selected elements that yields maximum power according to an embodiment.

FIG. 8 at (a) shows an example of which number of selected elements that yields maximum power as a function of elements selected within a distance D, in units of $2\pi$, from the element yielding highest received power, and at (b) shows the summed total power for the selected elements as a function of elements selected within a distance D, in units of $2\pi$ from the element yielding highest received power. As seen in the figure, both the number of elements and the corresponding summed total power first increase and then decrease as a function of the distance D from the element yielding highest received power.

Figure 9:
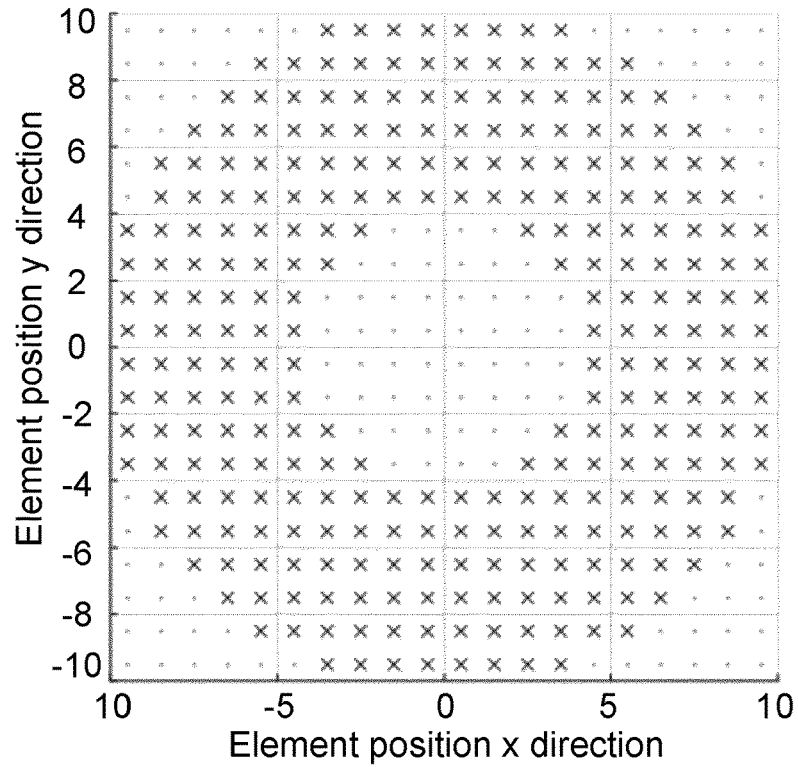
FIG. 9 schematically illustrates summed total power for selected elements according to an embodiment.

FIG. 9 shows an example of element positions of an IRS and which elements are selected to be active when a user equipment is in the near-field of the IRS. The examples are the result of simulation of an IRS with 400 atoms where the atoms are arranged in a 20-by-20 array. In the array all atoms equally spaced apart such that their centers are separated by 3 mm. For the simulation the user equipment is located at the center position of the array and 0.10 m away from the array. This selection of elements for the given simulation ensures that, with proper phase adjustment, the combination of elements will ensure maximum power transfer in the near-field.

There could be different predefined intervals. In general terms, the boundaries of the predefined interval will depend on the general design of the elements 121a, 121b and how the phase shift can be implemented. If the elements 121a, 121b comprises phase shifters 124 then a signal reflected by the IRS will pass the phase shifters 124 twice; once when incoming and once when being reflected. Then the range could be [0, $4\pi$]. The range could have different end-points for other implementations of the elements 121a, 121b. In some non-limiting examples, the predefined interval is either [0, $2\pi$], or [0, $4\pi$]. That is, according to this example, all atoms for which the phase shift should be shifted by a value in the range [0, $2\pi$] or [0, $4\pi$] would be selected to be part of the first subset. In some embodiments, the predefined interval is related to the duration of the cyclic prefix (CP) duration used.

Figure 10:
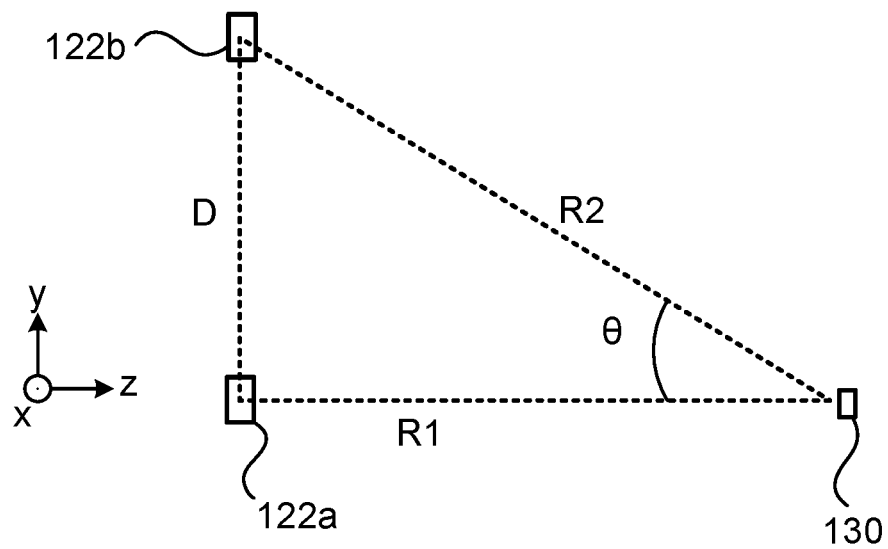
FIG. 10 schematically illustrates an IRS and a user equipment according to an embodiment.

In some embodiments, the gradient in received power, as used in step S104, is obtained in terms of an angle of arrival value of the signal transmitted from the user equipment 130. Further aspects of this will now be disclosed with reference to FIG. 10. FIG. 10 schematically illustrates an IRS 120 having two atoms 122a, 122b whose centers are separated by a distance D in the y direction. According to FIG. 10, the atoms 122a and 122b are in the xy plane. A user equipment 130 is located perpendicular to the xy plane with respect to atom 122a and is in the z direction with respect to the atoms 122a, 122b. The user equipment 130 is assumed to provide relatively isotropic radiation with respect to the atoms 122a, 122b. The distance between atom 122a and user equipment 130 is $R_1$ and the distance between atom 122b and user equipment 130 is $R_2$. $R_1$ and $R_2$ are thus in an angle $\theta$ with respect to each other. As $R_1$ is smaller than $R_2$, the received power, denoted $P_1$, at atom 122a, is larger than the received power, denoted $P_2$, at atom 122b. When the value of the angle $\theta$ is larger than a threshold angle, user equipment 130 is defined to be in the near-field of the IRS 120. The threshold angle can be calculated based on the tolerated power variation among to selected atoms and thus be user-defined. Hence, in some embodiments, the threshold value is dependent on tolerated power variation among the atoms 122. In other embodiments, the threshold value is dependent on how much the atoms 122 from which the measurements of received power were made by the measurement sensors 128 are distanced from each other and dimension of the IRS 120. A numerical value for the threshold angle can be computed from FIG. 11 (which will be described in further detail below). For example, with reference to FIG. 11, assume that 3 dB is set as the tolerance level of the power variation and that the IRS has a diagonal length of 4 m. Assume further that the user equipment is closest to the center-most element. Assume further that the difference in received power between the center-most element and an element at a distance of 2 m is 3 dB. This corresponds to that the user equipment is distanced 2 m from the center-most element and thus an angle of arrival to the element at a distance of 2 m from the center-most element of 45°. Hence, the threshold angle for this example is 45°.

From the Friis equation, the power is inversely proportional to the square of the distance. That is:

$$\frac{P_1}{P_2} = \frac{(R_2)^2}{(R_1)^2}.$$

Further, from the Pythagorean theorem follows that:

$$R_2 = \sqrt{(R_1)^2 + (D)^2}.$$

Substituting $R_2$ in the expression for the power ratios with $\sqrt{(R_1)^2 + (D)^2}$ yields:

$$\frac{P_1}{P_2} = \frac{(R_1)^2 + (D)^2}{(R_1)^2} \rightarrow \frac{P_1 - P_2}{P_2} = \frac{(D)^2}{(R_1)^2}.$$

Still further, from the assumptions in FIG. 8 follows that:

$$\tan\theta = \frac{D}{R_1}.$$

It then follows that the angle of arrival value, defined by θ, can be determined as:

$$\theta = \tan^{-1}\sqrt{\frac{P_1 - P_2}{P_2}},$$

where $P_1$ thus is the measurement of received power obtained from a measurement sensor at atom 122a and where $P_2$ thus is the measurement of received power obtained from a measurement sensor at atom 122b. As noted above, the IRS 120 generally comprises an array of elements, each comprising its own atom, and where some of the elements comprises a measurement sensor. There could then be different ways to select from which sensors the measurement of received power should be obtained. In some embodiments, $P_1$ is the highest of all the obtained measurements of received power and $P_2$ is one of the obtained measurements of received power that is more than a threshold lower than $P_1$ but still higher than a noise floor.

In some aspects, how much the phase shift is adjusted is proportional to the gradient in received power. Further, the angle of arrival value, defined by θ, can be utilized during the adjustment of the phase shift. In particular, the phase shift can be adjusted by a compensation factor Δϕ that is a function of the angle of arrival value. Assume that the signal transmitted from the user equipment 130 has a wavelength λ, that the atoms 122 from which the measurements of received power were made by the measurement sensors 128 are separated a distance D, and that the phase shift is adjusted by a compensation factor Δϕ. Then, in some embodiments, the compensation factor it Δϕ is determined according to:

$$\Delta\phi = \frac{2\pi D(\sin(\theta) - \tan(\theta))}{\lambda}.$$

Figure 11:
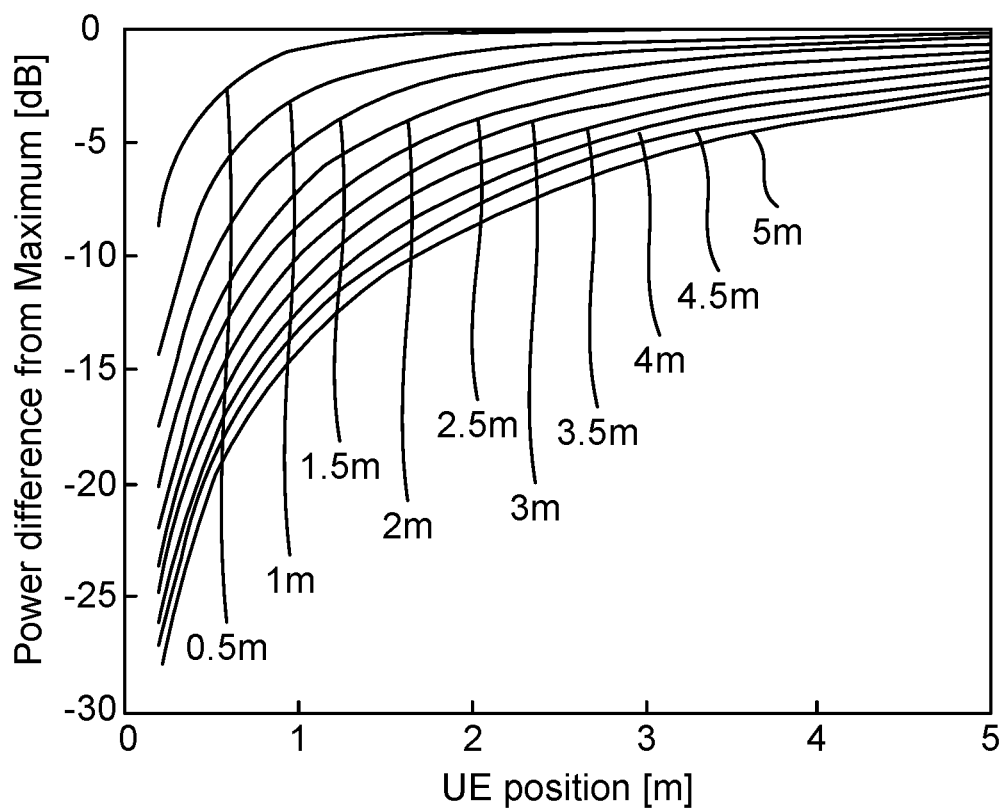
FIG. 11 schematically illustrates power difference from maximum received power as a function of distance between a user equipment an IRS according to an embodiment.

FIG. 11 shows the power difference, in dB, from the maximum received power as a function of the distance between the user equipment 130 and the IRS 120 for different dimensions of the IRS 120. As can be seen in the figure, the difference increases as the user equipment 130 is moved closer to the IRS 120 and as the size of the IRS increases. The maximum received power will be at the element which has the shortest distance to the user equipment 130 when the user equipment 130 is perpendicular to the array of elements. The larger the IRS 120 is, the larger the near-field will be. Whether the user equipment 130 is in the near-field or not can be detected by monitoring this power difference for a given distance.

Figure 12:
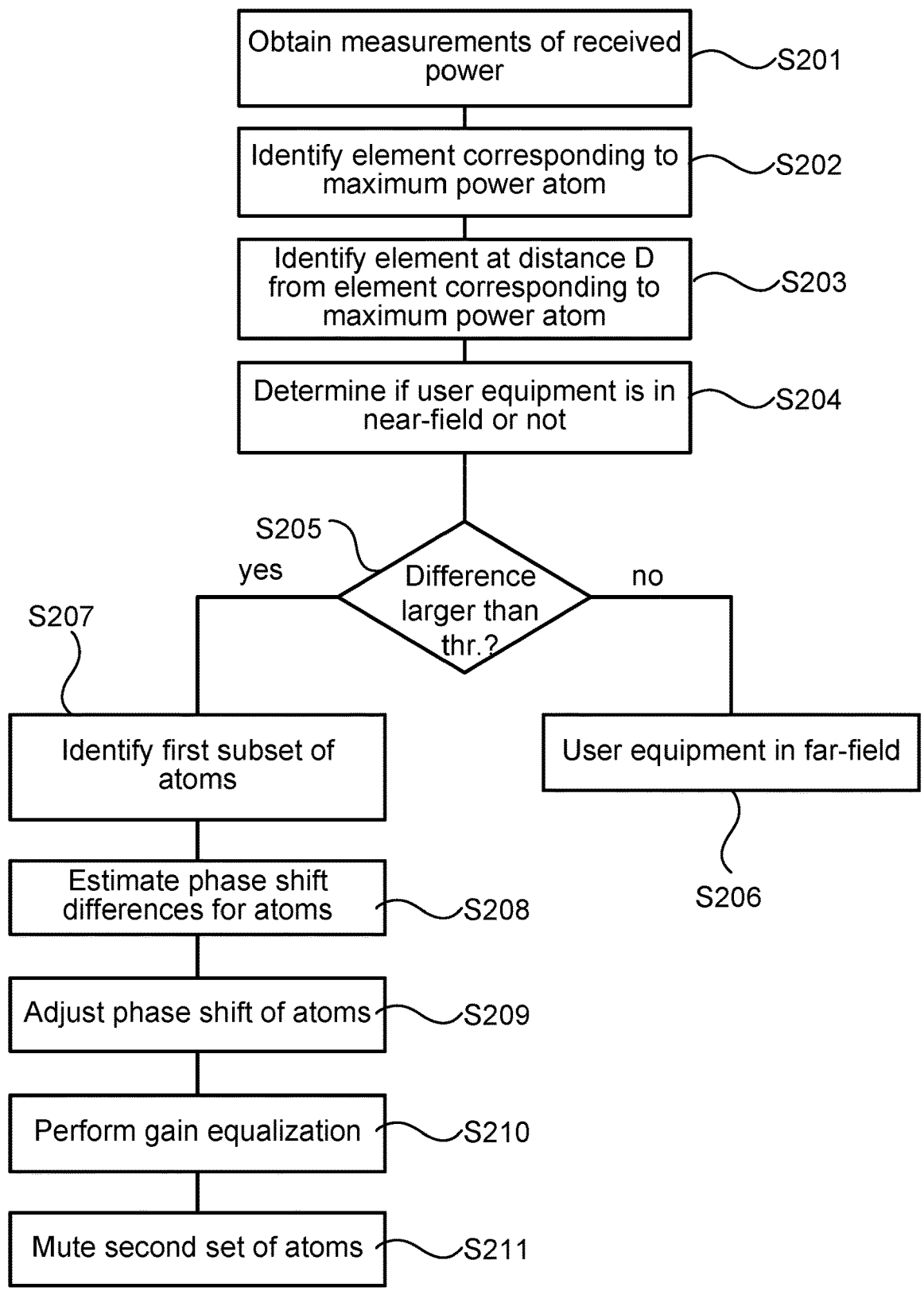
FIG. 12 is a flowchart of methods according to embodiments.

FIG. 12 is a flowchart of a method for adjusting atoms 122 of an IRS 120 as performed by the controller 200, and in particular to identify if the user equipment 130 is in the near-field of the IRS 120 or not.

S201: Measurements of received power of a signal transmitted from the user equipment 130 and received by the atoms 122 are obtained from the measurement sensors 128

S202: The element corresponding to the atom where the maximum amount of power was received is identified. This amount of power is denoted $P_1$.

S203: An element at a distance D from the element in step S202 is identified. The amount of power from the atom at this element is denoted $P_2$.

S204: It is determined, by comparing a gradient in received power, in terms of a difference between $P_1$ and $P_2$, to a threshold value, whether the user equipment 130 is in the near-field of the IRS 120 or not.

S205: If the gradient is larger than the threshold value the user equipment 130 is in the near-field of the IRS 120 and step S207 is entered. Else step S206 is entered.

S206: The user equipment 130 is in the far-field of the IRS 120. No further adjustment of the IRS 120 is required. Step S201 can then be entered again.

S207: A first subset of the atoms identified that yield an adjustment of the phase shift within a predefined interval and that maximize the number of members in the first subset subject to a power maximization criterion.

S208: Phase shift differences for the atoms in the first subset are estimated.

S209: The phase shift of the first subset of the atoms 122 is adjusted for reflection at the IRS 120 during subsequent communication between a network node 110 and the user equipment 130.

S210: Gain equalization is performed based on a measured gain variation between the atoms in the first subset.

S211: A second subset of the atoms 122 composed of those atoms 122 that are not part of the first subset are muted for reflection at the IRS 120 during the subsequent communication between the network node 110 and the user equipment 130. Step S201 can then be entered again.

Aspects of the user equipment 130 will now be disclosed. The user equipment 130 might be equipped with one or more antenna arrays, where each of the one or more antenna array comprises one or more individual elements, each element comprising an atom. The user equipment 130 might thereby be configured for beamforming. In case the user equipment 130 either by itself or by obtaining an indication from another entity, such as from the IRS 120 or controller 200 via the network node 110, determines that the user equipment 130 is in the near-field of the IRS 120, the user equipment 130 might form a wide beam, or an omni-directional beam. For example, the user equipment 130 might by itself determine that it is in the near-field of the 120 130 when a variation in received power (between two individual elements, or atoms) is above a threshold value.

Figure 13:
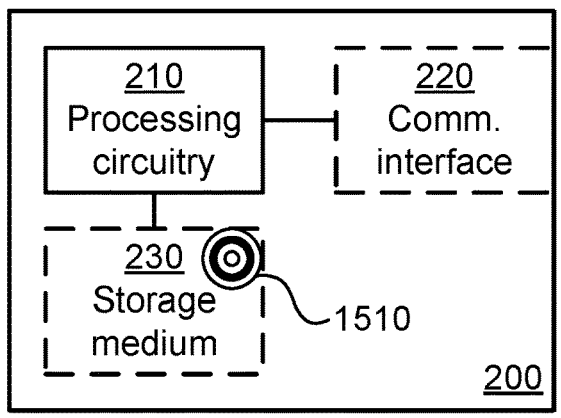
FIG. 13 is a schematic diagram showing functional units of a controller 200 according to an embodiment.

FIG. 13 schematically illustrates, in terms of a number of functional units, the components of a controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1510 (as in FIG. 15), e.g. in the form of a storage medium 230. The processing circuitry 210 may further be provided as at least one application specific integrated circuit (ASIC), or field programmable gate array (FPGA).

Particularly, the processing circuitry 210 is configured to cause the controller 200 to perform a set of operations, or steps, as disclosed above. For example, the storage medium 230 may store the set of operations, and the processing circuitry 210 may be configured to retrieve the set of operations from the storage medium 230 to cause the controller 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The controller 200 may further comprise a communications interface 220 at least configured for communications with the IRS 120. As such the communications interface 220 may comprise one or more transmitters and receivers, comprising analogue and digital components. The processing circuitry 210 controls the general operation of the controller 200 e.g. by sending data and control signals to the communications interface 220 and the storage medium 230, by receiving data and reports from the communications interface 220, and by retrieving data and instructions from the storage medium 230. Other components, as well as the related functionality, of the controller 200 are omitted in order not to obscure the concepts presented herein.

Figure 14:
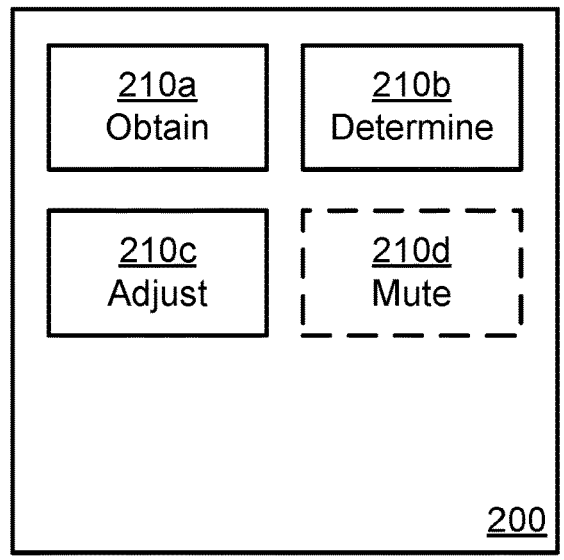
FIG. 14 is a schematic diagram showing functional modules of a controller 200 according to an embodiment.

FIG. 14 schematically illustrates, in terms of a number of functional modules, the components of a controller 200 according to an embodiment. The controller 200 of FIG. 14 comprises a number of functional modules; an obtain module 210a configured to perform step S102, a determine module 210b configured to perform step S104, and an adjust module 210c configured to perform step S106. The controller 200 of FIG. 14 may further comprise a number of optional functional modules, such a mute module 210d configured to perform step S108. In general terms, each functional module 210a:210e may in one embodiment be implemented only in hardware and in another embodiment with the help of software, i.e., the latter embodiment having computer program instructions stored on the storage medium 230 which when run on the processing circuitry makes the controller 200 perform the corresponding steps mentioned above in conjunction with FIG. 14. It should also be mentioned that even though the modules correspond to parts of a computer program, they do not need to be separate modules therein, but the way in which they are implemented in software is dependent on the programming language used. Preferably, one or more or all functional modules 210a:210e may be implemented by the processing circuitry 210, possibly in cooperation with the communications interface 220 and/or the storage medium 230. The processing circuitry 210 may thus be configured to from the storage medium 230 fetch instructions as provided by a functional module 210a:210e and to execute these instructions, thereby performing any steps as disclosed herein.

The controller 200 may be provided as a standalone device or as a part of at least one further device. For example, the controller 200 may be part of, integrated with, or collocated with, the IRS 120. Alternatively, functionality of the controller 200 may be distributed between at least two devices, or nodes. A first portion of the instructions performed by the controller 200 may be executed in a first device, and a second portion of the of the instructions performed by the controller 200 may be executed in a second device; the herein disclosed embodiments are not limited to any particular number of devices on which the instructions performed by the controller 200 may be executed. Hence, the methods according to the herein disclosed embodiments are suitable to be performed by a controller 200 residing in a cloud computational environment. Therefore, although a single processing circuitry 210 is illustrated in FIG. 13 the processing circuitry 210 may be distributed among a plurality of devices, or nodes. The same applies to the functional modules 210a:210e of FIG. 14 and the computer program 1520 of FIG. 15.

Figure 15:
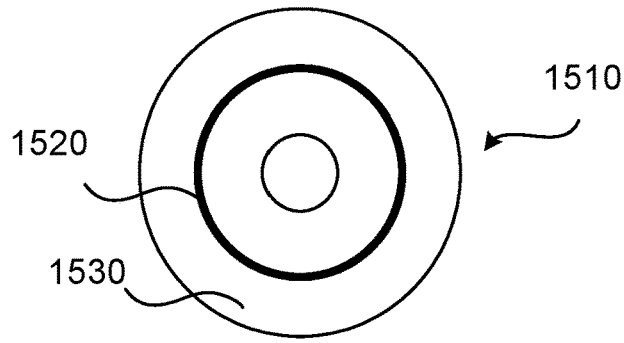
FIG. 15 shows one example of a computer program product comprising computer readable storage medium according to an embodiment.

FIG. 15 shows one example of a computer program product 1510 comprising computer readable storage medium 1530. On this computer readable storage medium 1530, a computer program 1520 can be stored, which computer program 1520 can cause the processing circuitry 210 and thereto operatively coupled entities and devices, such as the communications interface 220 and the storage medium 230, to execute methods according to embodiments described herein. The computer program 1520 and/or computer program product 1510 may thus provide means for performing any steps as herein disclosed.

In the example of FIG. 15, the computer program product 1510 is illustrated as an optical disc, such as a CD (compact disc) or a DVD (digital versatile disc) or a Blu-Ray disc. The computer program product 1510 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1520 is here schematically shown as a track on the depicted optical disk, the computer program 1520 can be stored in any way which is suitable for the computer program product 1510.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for adjusting atoms of an intelligent reflective surface, IRS, the method being performed by a controller, the controller being configured to control the IRS, the IRS comprising an array of the atoms, wherein each of the atoms has an individually adjustable phase shift and gain, and wherein at least some of the atoms are provided with a measurement sensor, the method comprising:
- obtaining, from the measurement sensors, measurements of received power of a signal transmitted from a user equipment and received by the atoms;
- determining, by a gradient in received power between two of the measurement sensors being larger than a threshold value, that the user equipment is in near-field of the IRS; and as a result thereof:
  - adjusting the phase shift of a first subset of the atoms for reflection at the IRS of subsequent communication between a network node and the user equipment when the user equipment is in the near-field of the IRS.

2. The method according to claim 1, wherein the method further comprises:
- muting a second subset of the atoms for reflection at the IRS of the subsequent communication between the network node and the user equipment.

3. The method according to claim 2, wherein each of the atoms is either a member of the first subset or the second subset but not both.

4. The method according to claim 2, wherein none of the atoms in the second subset yield an adjustment of the phase shift within the predefined interval.

5. The method according to claim 1, wherein the atoms in the first subset all yield an adjustment of the phase shift within a predefined interval and maximize number of members in the first subset subject to a power maximization criterion.

6. The method according to claim 5, wherein the predefined interval is either $[0, \pi]$, or $[0, 4\pi]$.

7. The method according to claim 1, wherein how much the phase shift is adjusted is proportional to the gradient in received power.

8. The method according to claim 1, wherein the gradient in received power is obtained in terms of an angle of arrival value of the signal transmitted from the user equipment.

9. The method according to claim 8, wherein the angle of arrival value is denoted $\theta$ and is determined according to:

$$\theta = \tan^{-1}\sqrt{\frac{P_1 - P_2}{P_2}},$$

where $P_1$ is measurement of received power obtained from one of the measurement sensors and where $P_2$ is the measurement of received power obtained from another one of the measurement sensors.

10. The method according to claim 9, wherein $P_1$ is the highest of all the obtained measurements of received power and where $P_2$ is one of the obtained measurements of received power that is more than a threshold lower than $P_1$ but still higher than a noise floor.

11. The method according to claim 9, wherein the signal transmitted from the user equipment has a wavelength $\lambda$, wherein the atoms from which the measurements of received power were made by the measurement sensors are separated a distance D, and wherein the phase shift is adjusted by a compensation factor $\Delta\phi$ determined according to:

$$\Delta\phi = \frac{2\pi D(\sin(\theta) - \tan(\theta))}{\lambda}.$$

12. The method according to claim 1, wherein the threshold value is dependent on tolerated power variation among the atoms.

13. The method according to claim 1, wherein the threshold value is dependent on how much the atoms from which the measurements of received power were made by the measurement sensors are distanced from each other and dimension of the IRS.

14. The method according to claim 1, wherein the atoms provided with the measurement sensors are evenly distributed throughout the IRS.

15. The method according to claim 1, wherein the atoms provided with the measurement sensors are randomly distributed throughout the IRS.

16. A controller for adjusting atoms of an intelligent reflective surface, IRS, the controller being configured to control the IRS, the IRS comprising an array of the atoms, wherein each of the atoms has an individually adjustable phase shift and gain, and wherein at least some of the atoms are provided with a measurement sensor, the controller comprising processing circuitry, the processing circuitry being configured to cause the controller to:
- obtain, from the measurement sensors, measurements of received power of a signal transmitted from a user equipment and received by the atoms;
- determine, by a gradient in received power between two of the measurement sensors being larger than a threshold value, that the user equipment is in near-field of the IRS;
- and as a result thereof:
  - adjust the phase shift of a first subset of the atoms for reflection at the IRS of subsequent communication between a network node and the user equipment when the user equipment is in the near-field of the IRS.

17. A non-transitory computer readable medium comprising computer code which, when run on processing circuitry of a controller, the controller being configured to control an intelligent reflective surface, the IRS comprising an array of atoms, wherein each of the atoms has an individually adjustable phase shift and gain, and wherein at least some of the atoms are provided with a measurement sensor, causes the controller to:
- obtain, from the measurement sensors, measurements of received power of a signal transmitted from a user equipment and received by the atoms;
- determine, by a gradient in received power between two of the measurement sensors being larger than a threshold value, that the user equipment is in near-field of the IRS; and as a result thereof:
  - adjust the phase shift of a first subset of the atoms for reflection at the IRS of subsequent communication between a network node and the user equipment when the user equipment is in the near-field of the IRS.

* * * * *